United States Patent Office
2,912,867
Patented Nov. 17, 1959

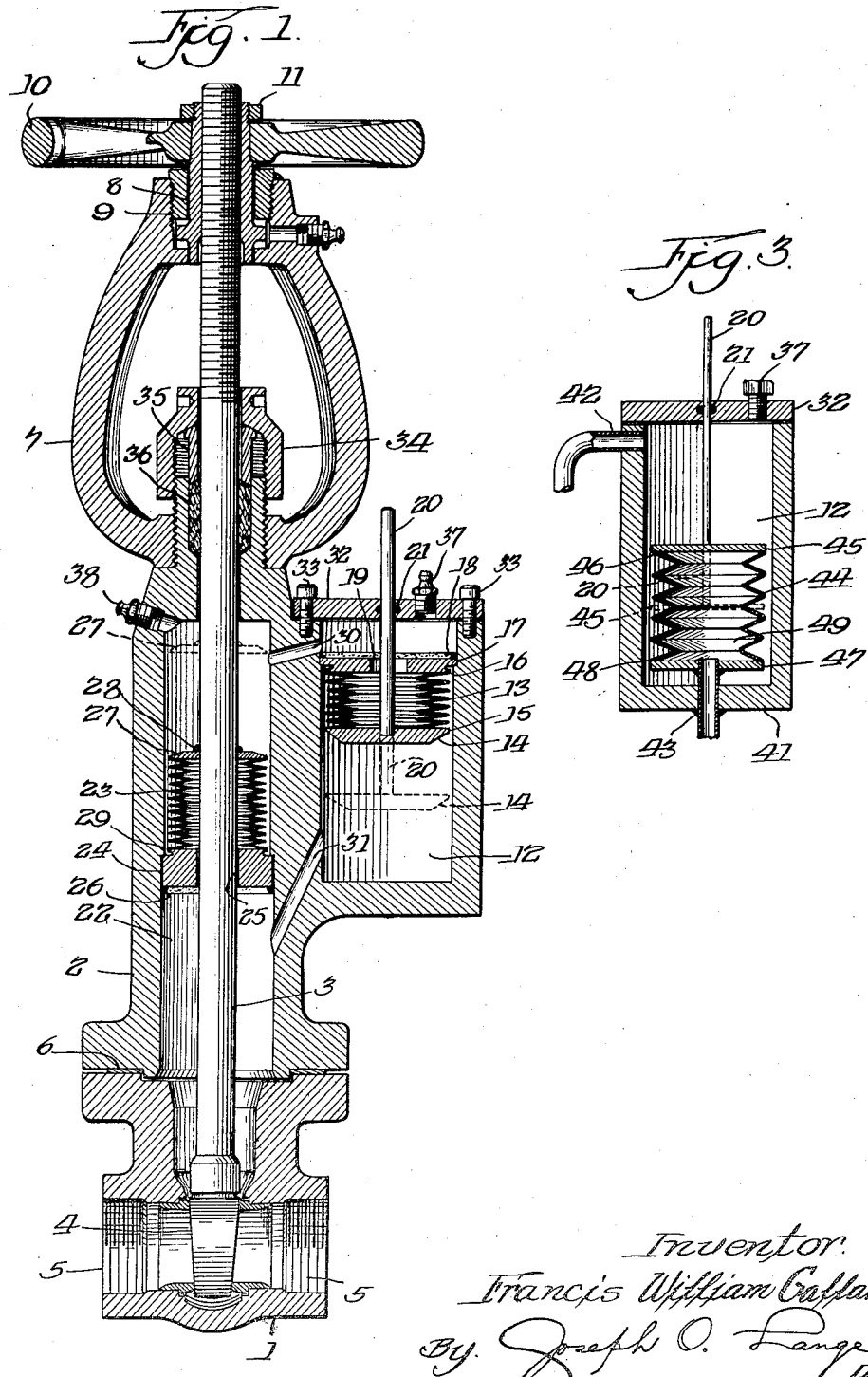

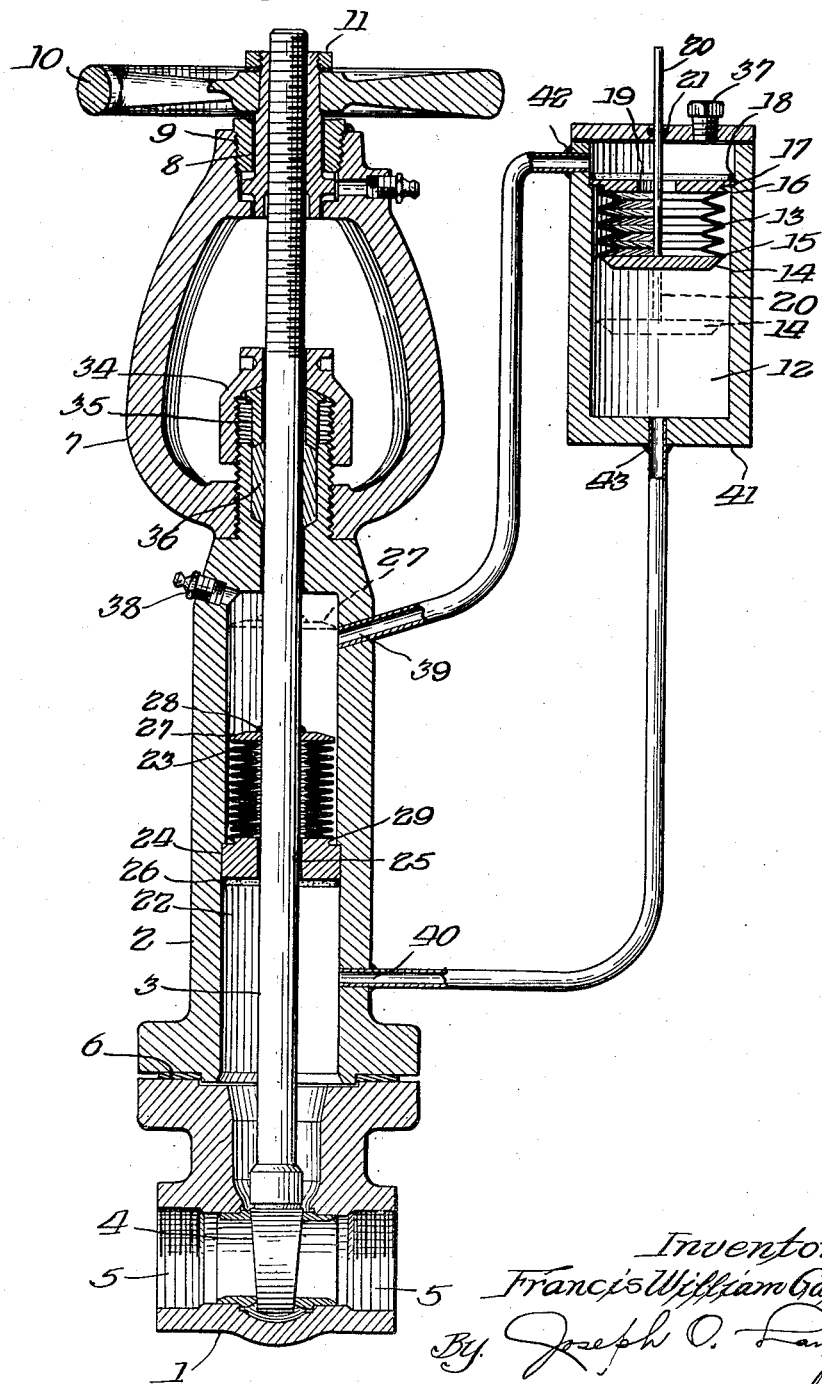

2,912,867

PRESSURE EQUALIZED BELLOWS VALVE STEM SEAL

Francis William Gallant, Tinley Park, Ill., assignor to Crane Co., Chicago, Ill., a corporation of Illinois Application August 12, 1955, Serial No. 528,003

3 Claims. (Cl. 74—18.2)

This invention relates generally to a shaft seal, and, more particularly, it is concerned with a type of construction employing a seal having pressure equalized bellows.

One of the more important objects of the invention is to provide for a mechanical seal for extremely difficult service in which a conventional stuffing box is unsatisfactory because of packing difficulties and this is particularly true in such cases where there is the requirement of a positive or hermetic seal being maintained between primary and secondary liquids or gases.

It is well known that conventional stuffing boxes often fail to hold fluids which have low surface tension, low viscosity or low molecular weight. Further, they do not present an absolute permanently pressure tight barrier which is needed to seal highly poisonous fluids, for example, from the atmosphere. Conventional bellows and diaphragm seals for high pressure are of necessity generally too inflexible or rigid to provide the desired flexing and travel in an appreciable distance by ordinary means of power application.

It is therefore an important object of this invention to provide a seal enabling motion of a slidable non-rotating staff or stem to be transmitted through a pressure wall and at the same time to positively seal by means of a bellows or diaphragm the primary fluid hermetically under extremes of high or low pressures from fluids escaping past the shaft.

It is another important object of this invention to provide a long stem travel by being enabled to use flexible thin wall bellows or diaphragm and capable of use on high pressures as well as low pressures by a novel counterbalancing of pressures applied.

A further object is to permit a long stem travel by using a flexible thin walled bellows for variable pressure ranges.

It is a further object to provide a construction in which the usual rupture of a fragile thin walled bellows or diaphragm on high pressures is prevented by equalizing or compensating the fluid pressures across the bellows wall by means of a secondary liquid of near incompressible character and applied to the bellows or diaphragm.

Under present installations, bellows valves normally operate under unbalanced pressure conditions which require heavier and stiffer construction in such bellows on high pressures. By the present invention, a primary fluid is separated from a secondary fluid leaving only the secondary fluid with higher viscosity to be sealed.

Another accomplishment of the present invention is to provide a construction in which the length of permissible travel of the stem or shaft, for example, in the valve is greater by the use of a multiple diaphragm bellows which are more flexible than the convoluted tube type necessarily used in prior designs.

A further object of the invention is to provide for a construction in which the loss of the secondary fluid and the change of volume due to temperature changes is relatively easily provided and compensated and no external fluid pressures need be generated to compromise with line or primary fluid pressures. Further with the device being suitably sealed, the means for balancing pressures is properly confined.

Other objects and advantages will become more readily apparent upon proceeding with the specification read in light of the accompanying drawings, in which—

Fig. 1 is a sectional assembly view of a valve embodying a preferred form of my invention.

Fig. 2 is a sectional assembly view of a modified form.

Fig. 3 is a fragmentary sectional view of a modified form of bellows.

Similar reference numerals refer to similar parts throughout the several views.

Referring now to Fig. 1, a conventional casing 1 for a gate valve is shown having the usual bonnet 2 attached thereto. For actuating means, a non-rotatable valve stem 3 is employed, the lower end portion of which has attached a gate closure member 4 engaging valve seats in the casing in the valve closed position as indicated. The casing 1 is provided with the usual pipe connections 5 and at its upper end is provided with a gasket 6 for maintaining fluid tight relation with the bonnet 2.

At the upper end of the bonnet, a yoke 7 is attached at the upper end of which is mounted the usual yoke sleeve 8 for threaded engagement with the stem and which is held in place by means of the threaded yoke bushing 9.

The handwheel 10 is mounted in non-rotatable relation upon the yoke sleeve 8 and held securely in position by means of the yoke sleeve nut 11. It will be apparent that by rotation of the handwheel 10, the stem 3 moving upon the threads within the yoke sleeve will be caused to reciprocate within the valve casing depending upon the direction of rotation of the handwheel 10.

At one side of the bonnet 2, the compensating chamber 12 is provided. Within the said chamber, what is termed a compensating bellows 13 is mounted having at its lower end portion a base member 14 to which the compensating bellows is mounted in sealed relation at the peripheral portion indicated at 15. At the upper end of the bellows 13, the latter member is sealed as at 16 to an upper apertured plate 17 held in weld sealed fixed position as at 18 within the chamber 12. The aperture 19 of the plate 17 allows for the projection therethrough of an indicator rod 20 preferably sealed within an O-ring or the suitable packing means as at 21, the bellows having a stretch or movement range as indicated by the dotted lines depending upon the pressure condition encountered. Of course if several superposed sealing bellows are used the range of longitudinal movement of the stem may be materially increased. Similarly, the bellows in either case may be reversed if desired.

Within the bonnet chamber 22, a stem bellows 23 is mounted having at its lower limits an apertured base plate 24 allowing for the reception of the stem to project therethrough as at 25 and being held in fixed position within the chamber 22 by means of the annular weld 26. At the upper end of the bellows 23, a plate 27 is provided which is welded in sealed relation as at 28 to the valve stem 3. It should be understood that with respect to both upper and lower plates 27 and 24 respectively, the bellows 23 is mounted in fluid sealing relation at its peripheral portions, as indicated for example in the lower plate at 29. Thus, the only path for the entry of fluid pressure within the bellows is by means of fluid moving past the stem and through the aperture 25 into the interior of the bellows 23.

The compensating chamber 12 is joined with the bonnet chamber 22 by means of the upper and lower transverse passages 30 and 31, respectively.

A cover 32 mounted in fluid tight relation seals the chamber 12 by means of the cap screws 33 as indicated.

Within the yoke and encircling the stem to provide an additional packing means outside of the bonnet, a threaded stuffing nut 34 is used engaging the gland 35 and to which compresses the packing 36 around the valve stem in the usual manner.

For purpose of supplying secondary fluid to the sealed chambers thus formed above the respective bellows 13 and 23, a supply fitting 37 is employed which is mounted on the cap or cover 32. To allow for the overflow of secondary fluid such as oil, and the bleeding of air during the course of supplying such secondary fluid a conventional relief discharge fitting 38 is mounted as indicated at the upper end of the bonnet 2.

In considering the operation of the device hereinabove described, it will be understood that as the valve stem 3 is raised in order to open the valve, the bellows 23 will be stretched substantially to an extent indicated by the dotted line position of the upper plate 27. Concurrently with such stem and valve closure movement, the secondary fluid within the respective chambers above the bellows 13 and 23 will be correspondingly displaced by movement of the bellows 23 to the position indicated. Such secondary fluid will flow through the chamber connecting passage 30 and thereby move into the chamber immediately above the compensating bellows 13 to cause the latter member to be stretched or extended, which latter position is indicated by the dotted line of the members 14 and 20, respectively. When the stem 3 and the valve closure member 4 is subsequently lowered in order to close the valve, both bellows 13 and 23 will return to the position indicated by the solid lines shown in Fig. 1. Thus, it will be clear that by such movement of the respective bellows 13 and 23, the conventional stuffing box above described at 34 seals off the secondary fluid and of course any loss of secondary fluid will be indicated by the relative movement of the indicator rod 20 whereupon it may be suitably replenished.

When the pressure in the primary fluid increases or decreases, pressures correspondingly increase in the secondary fluid and since the secondary fluid is practically incompressible it is to be expected that only slight movement of the bellows will take place. If leakage of secondary fluid should occur, balanced pressures would be maintained until the bellows 13 collapse. The secondary fluid of course encircling and practically filling the chamber around the bellows 23 will support the latter against the otherwise harmful effects of expansion by the pressures entering the interior of the bellows 23 past the stem aperture at 25 of the plate 24. Thus, it will be clear that relatively thin walled bellows may be used due to the balance of the pressures around the bellows being effected.

In describing Fig. 1, the compensating chamber 12 is described as being closely associated with the bonnet 2, but of course such close association is not necessarily required except for purpose of convenience, depending upon the nature of the installation encountered in the field.

With this in mind, attention is now directed to the assembly shown in Fig. 2, wherein a modified form is shown in which the compensating chamber 12 retained within a separate container 41 is connected by suitable conduits 39 and 40 to the upper and lower portions respectively of the bonnet chamber 22 in the same manner as described in connection with the conduits 30 and 31 of Fig. 1. In this modification, the container 41 is joined to the tubing 39 and 40 as at 42 and 43 respectively and depending upon the requirement of the installation, the container 41 may be located a considerable distance from the valve assembly. The usual filler or supply fitting 37 may be employed to bring the fluid to the container chamber 12 and to the interior of the conduit 39 as well as that portion of the chamber of the bonnet above the bellows 23. In all other respects, the operation of the assembly shown in Fig. 2 is identical to that described in connection with Fig. 1 and in this connection it will be clear that the container 41 can be located at any convenient location considering accessibility and ease in detecting loss of secondary fluid. The necessary refill fitting 37 can be applied conveniently when occasion warrants.

Under certain types of installations, it might be desirable to provide a compensating chamber in which the secondary fluid as shown in the modified form in Fig. 3 is applied to the chamber 12 outside of the bellows 44. The latter is attached in fluid sealed relation at 43 by means of the upper plate 45 sealed as at 46 and attached to a lower apertured plate 47 in sealed relation thereto as at 48. It will be noted that in this form, the conduit 43 provides for the primary fluid or gas pressure to apply on the inside surfaces chamber 49 of the bellows 44. The top of the bellows being sealed as above described. However, here also, the mode of operation will be the same as described in connection with the other figures and of course the casing 41 may be suitably connected at relative close position relative to the bonnet 2 as shown in connection with Fig. 1.

It will be appreciated that the several configurations shown and described may vary substantially and still fall within the spirit of the invention as defined by the appended claims.

I claim:

1. In a pressure compensating means, the combination comprising a casing including a pair of interconnected primary and secondary pressure chambers predeterminately in communication with a common fluid pressure source through the said casing, a longitudinally movable shaft within said primary pressure chamber, a bellows enclosing the said shaft at one portion along its length and being mounted in fluid sealing relation on the said shaft and at another portion thereof being mounted in fluid sealing relation to an inner wall of the said primary chamber, the said secondary pressure chamber having a pressure responsive compensating bellows with a fixed portion thereof mounted in fluid sealing relation to the said secondary chamber, means for supplying upper portions of the said primary and secondary chambers with a substantially incompressible fluid, the said secondary compensating bellows being hollow and with an opening communicating with the hollow portion thereof to receive said incompressible fluid, the lower portions of each of the pressure chambers being interconnected and in communication with said common pressure fluid source, the said shaft fluid seal being expandible in response to said latter fluid pressure source, the said compensating bellows being expandible under the influence of said incompressible fluid thereby to effect a biasing application of the incompressible fluid against the said shaft sealing connection and the said first named bellows to equalize the fluid pressure on each side of the said shaft seal and the compensating bellows upon longitudinal movement of the said shaft relative to the said primary chamber.

2. In a pressure compensating means, the combination compriisng a casing including a pair of interconnected primary and secondary pressure chambers predeterminately in communication with a common fluid pressure source through the said casing, a longitudinally movable shaft within said primary pressure chamber, a bellows enclosing the said shaft at one portion along its length and being mounted in fluid sealing relation on the said shaft and at another portion thereof in a plane below the said fluid sealed portion of the shaft and being fixedly mounted in fluid sealing relation to an inner wall of the said primary chamber, the said secondary pressure chamber having a pressure responsive compensating bellows with a fixed portion thereof mounted in fluid sealing relation to the said secondary chamber, means for supplying upper portions of the said primary and secondary chambers with a substantially incompressible fluid, the said secondary compensating bellows being hollow and having an opening communicating with the hollow portion thereof to receive said incompressible fluid, the lower portions of each of the pressure chambers being interconnected and in communication with said common pressure fluid source, the said shaft fluid seal being expandible in response to said latter fluid pressure source, the said shaft sealing bellows having its lowermost portion fixedly mounted on said inner wall of the primary chamber in a plane above an opening in the said wall in direct communication with the said secondary chamber, the said compensating bellows being expandible under the influence of said incompressible fluid and in cooperation with the said interconnected primary and secondary chambers providing for the application of the incompressible fluid against outer surfaces of the shaft sealing bellows and the compensating bellows of the secondary chamber to equalize the fluid pressure on each side of the said shaft seal and the compensating bellows upon predetermined axial movement of the said shaft within the said casing.

3. In a pressure compensating means, the combination comprising a casing including a pair of relatively side disposed interconnected primary and secondary pressure chambers predeterminately in communication with a common fluid pressure source through the said casing, a longitudinally movable shaft within said primary pressure chamber, a bellows enclosing a periphery of the said shaft at one portion along its length in fluid sealing relation and at another portion thereof being mounted in fluid sealing relation to an inner wall of the said primary chamber, the latter wall sealing arrangement partitioning transversely the said primary chamber, upper and lower passages communicating with the partitioned chamber, the said secondary pressure chamber having a pressure responsive compensating bellows with a fixed portion thereof mounted in fluid sealing relation to the said secondary chamber, means for supplying upper portions of the said primary and secondary chambers with a substantially incompressible fluid, the said secondary compensating bellows being hollow and having an opening communicating with the hollow portion thereof to receive said incompressible fluid, the lower portions of each of the pressure chambers being interconnected by at least one of the said passages and being in communication with said common pressure fluid source, the said shaft fluid seal being expandible in response to said latter fluid pressure source, the said passages cooperating with the said compensating bellows to provide for the latter member being expandible under the influence of said incompressible fluid thereby to effect a biasing application of the incompressible fluid against the said shaft sealing connection and the said first named bellows to equalize the fluid pressure on both inside and outside of the said shaft seal and also of the compensating bellows upon predetermined longitudinal movement of the said shaft relative to the said primary chamber, one of the said passages connecting the respective upper portions of the primary chamber and the secondary chamber, the other passage connecting the respective lower portions of the primary chamber and the secondary chamber.

References Cited in the file of this patent

UNITED STATES PATENTS

| | | |
|---|---|---|
| 1,835,877 | Joyce | Dec. 8, 1931 |
| 2,102,797 | Helmer | Dec. 21, 1937 |
| 2,444,703 | Jones | July 6, 1948 |
| 2,545,422 | Blom | Mar. 13, 1951 |